United States Patent
Yanazawa et al.

(10) Patent No.: US 9,991,025 B1
(45) Date of Patent: Jun. 5, 2018

(54) EXTERIOR END PORTION CAP AND WIRE HARNESS

(71) Applicant: YAZAKI CORPORATION, Tokyo (JP)

(72) Inventors: Kenta Yanazawa, Makinohara (JP); Takashi Tsukuda, Makinohara (JP); Ryohei Toyoda, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 0 days. days.

(21) Appl. No.: 15/831,868

(22) Filed: Dec. 5, 2017

(30) Foreign Application Priority Data

Dec. 6, 2016 (JP) .................................. 2016-236463

(51) Int. Cl.
| | |
|---|---|
| *H01B 7/00* | (2006.01) |
| *H02G 3/34* | (2006.01) |
| *B60R 16/02* | (2006.01) |
| *H02G 3/04* | (2006.01) |

(52) U.S. Cl.
CPC ....... *H01B 7/0045* (2013.01); *B60R 16/0215* (2013.01); *H02G 3/34* (2013.01); *H02G 3/0481* (2013.01)

(58) Field of Classification Search
CPC ...... H01B 7/0045; H02G 3/34; H02G 3/0462; H02G 3/0481; H02G 3/0568; B60R 16/0222

See application file for complete search history.

(56) References Cited

U.S. PATENT DOCUMENTS

| | | | | |
|---|---|---|---|---|
| 9,865,379 | B2 * | 1/2018 | DePompeo | ............ H01B 17/58 |
| 9,905,337 | B2 * | 2/2018 | Komori | .................. H01B 7/282 |
| 2003/0102142 | A1 * | 6/2003 | Miyamoto | .......... B60R 16/0215 174/542 |
| 2011/0297415 | A1 | 12/2011 | Katou et al. | |
| 2014/0338971 | A1 * | 11/2014 | Yoshida | .............. B60R 16/0215 174/72 A |
| 2016/0336097 | A1 * | 11/2016 | Sakagami | ............. H02G 15/013 |
| 2017/0117070 | A1 * | 4/2017 | Komori | .................. H01B 7/282 |
| 2017/0148542 | A1 * | 5/2017 | Maeda | .................. H01B 7/0045 |
| 2017/0263350 | A1 * | 9/2017 | Oka | ..................... B60R 16/0215 |

FOREIGN PATENT DOCUMENTS

JP 2011-254614 A 12/2011

* cited by examiner

*Primary Examiner* — Timothy Thompson
*Assistant Examiner* — Amol Patel
(74) *Attorney, Agent, or Firm* — Sughrue Mion, PLLC

(57) ABSTRACT

An exterior end portion cap is configured to be attached to electrically conductive paths and an exterior member. The exterior end portion cap includes an external exposure portion having a first blocking portion and an internal insertion portion having a second block portion. The internal insertion portion has a slit. The second blocking portion has a convex portion that is fitted to a gap between the electrically conductive paths. The exterior end portion cap is configured to be divided into two divided parts. The slit is disposed in a position corresponding to a position of a divided surface of the two divided parts and is formed so as to bring the part of the outer surfaces of the electrically conductive paths into contact with an inner surface of the exterior member near the end portion of the exterior member.

6 Claims, 12 Drawing Sheets

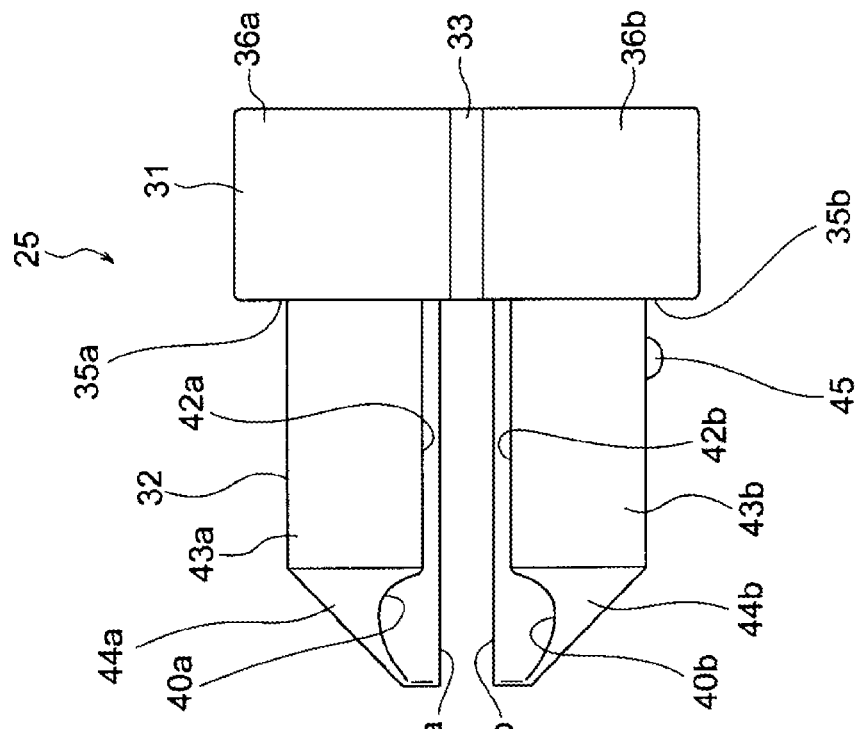
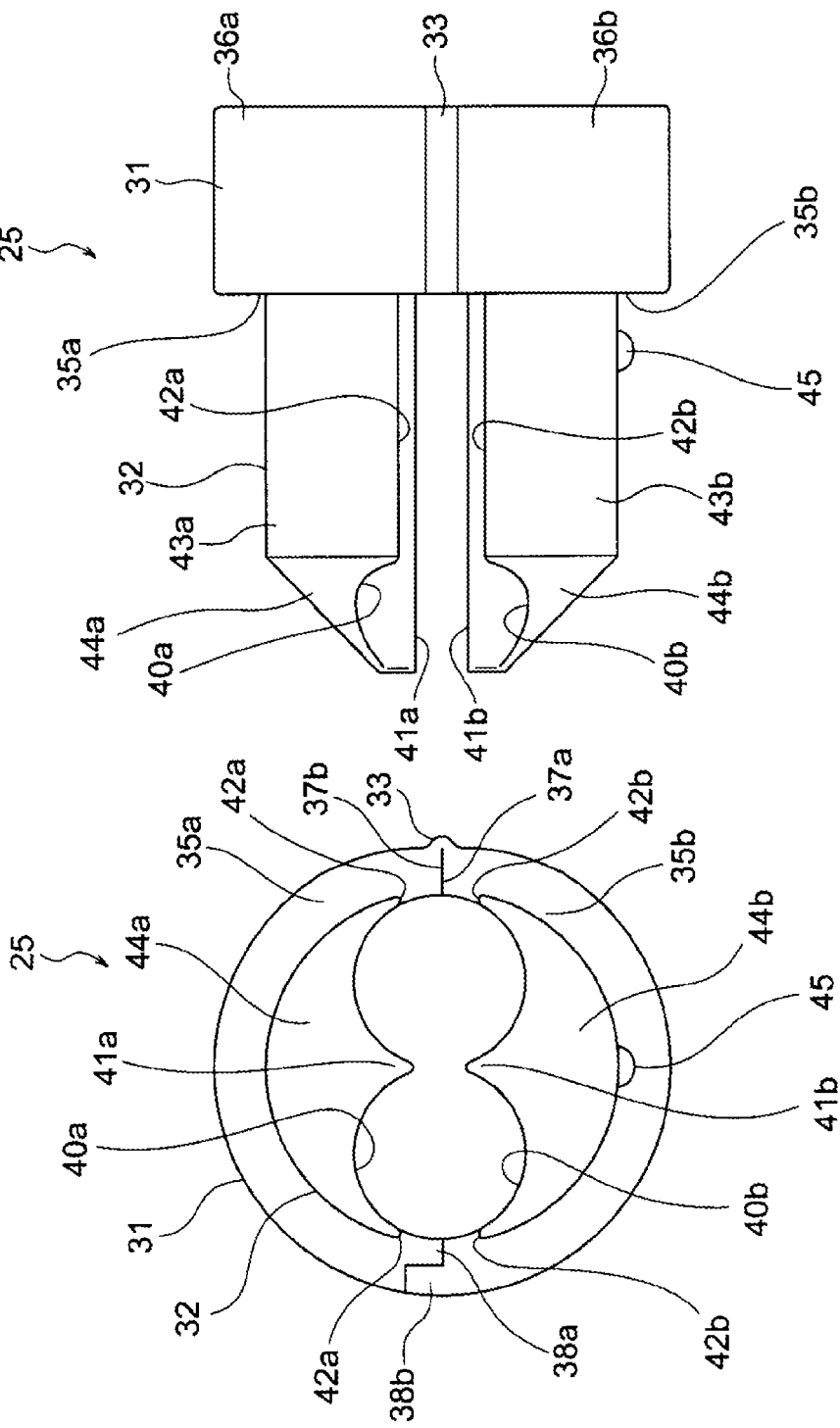

EXTERIOR END PORTION CAP AND WIRE HARNESS

CROSS REFERENCE TO RELATED APPLICATIONS

This application is based on Japanese Patent Application (No. 2016-236463) filed on Dec. 6, 2016, the contents of which are incorporated herein by reference.

BACKGROUND OF THE INVENTION

1. Field of the Invention

The present invention relates to an exterior end portion cap which is attached to an end portion of an exterior member. The invention also relates to a wire harness which is configured to include the exterior end portion cap.

2. Description of the Related Art

A wire harness is used for electrically connecting devices mounted in a car to each other. The wire harness is configured to include an exterior member shaped like a tubular body, and one electrically conductive path or a plurality of electrically conductive paths housed in the exterior member. For example, a wire harness disclosed in JP-A-2011-254614 is routed to pass through a vehicle underfloor of a car. Of the wire harness, a portion corresponding to the vehicle underfloor is routed straightly. Such a wire harness is formed to have a long length. Incidentally, the following thing particularly about the straightly routed portion is described in JP-A-2011-254614. That is, it is known that there is a possibility that an electrically conductive path or electrically conductive paths inside an exterior member may shake due to vibration during running etc.

The above related art has the following problem. That is, when the electrically conductive path or each of the electrically conductive paths inside the exterior member shakes largely due to the vibration during running, a coating (a braid or metal foil in an outer side of the electrically conductive path when the electrically conductive path has a shield function) of the electrically conductive path may strike against a tubular inner surface (inner circumferential surface) of the exterior member. On that occasion, sand etc. may intrude into the exterior member. In this case, there is a problem that the coating, the braid, etc. may be damaged easily.

As a solution to this problem, the following structure is generally used. That is, taping is applied to an end portion of the exterior member to prevent sand etc. from intruding between the end portion and the electrically conductive path or paths. However, the structure has the following problem. That is, when, for example, the taping is not applied sufficiently, sand may intrude through a gap between adjacent ones of windings of the taping or a gap between adjacent ones of the electrically conductive paths. As a result, there is a problem that the intrusion of the sand may lead to the aforementioned damage.

SUMMARY OF THE INVENTION

The invention has been accomplished in consideration of the aforementioned circumstances. An object of the invention is to provide an exterior end portion cap which can prevent damage on an electrically conductive path inside an exterior member, and a wire harness which is configured to include the exterior end portion cap.

According to a first configuration of the invention which has been accomplished in order to attain the foregoing object, there is provided an exterior end portion cap to be attached to at least two electrically conductive paths and an exterior member having a tubular shape, and the at least two electrically conductive paths being led out from the exterior member, the exterior end portion cap including:

an external exposure portion having a first blocking portion and configured to be exposed to an outer side of the exterior member; and an internal insertion portion having a second block portion, being continuous to the external exposure portion, and configured to be inserted into the exterior member, wherein:

the internal insertion portion has an electrically conductive path exposing slit by which a part of outer surfaces of the at least two electrically conductive paths can be made to function as a third blocking portion when the internal insertion portion is attached to the at least two electrically conductive paths;

the first blocking portion is disposed on a side to which the internal insertion portion is continuous, and has a planar portion configured to abut against an end portion of the exterior member;

the second blocking portion has a convex portion that is disposed so as to face to the at least two electrically conductive paths arranged side by side and that is fitted to a gap between the at least two electrically conductive paths arranged side by side;

the exterior end portion cap is configured to be divided into two divided parts for holding the at least two electrically conductive paths each shaped like a circle in section therebetween; and the electrically conductive path exposing slit is disposed in a position corresponding to a position of a divided surface of the two divided parts and is formed so as to bring the part of the outer surfaces of the at least two electrically conductive paths into contact with an inner surface of the exterior member near the end portion of the exterior member in order to make the part of the outer surfaces of the at least two electrically conductive paths functions as the third blocking portion.

In addition, in order to attain the object, there is provided a wire harness including:

an exterior member having a tubular shape;

at least two electrically conductive paths that are arranged side by side and that are protected by the exterior member; and the exterior end portion cap that is attached to the at least two electrically conductive paths arranged side by side and the end portion of the exterior member.

According to the above configuration of the invention, the end portion of the exterior member can be blocked by the first blocking portion of the exterior end portion cap. In addition, the gap between the electrically conductive paths arranged side by side can be also blocked by the second blocking portion of the exterior end portion cap. Further, the inner surface (inner surface in line with the positions of the divided surfaces) of the exterior member can be also blocked by the portion (functioning as the third blocking portion) of the electrically conductive paths exposed from the pair of electrically conductive path exposing slits of the exterior end portion cap. By the first to third blocking portions, for example, sand etc. can be prevented from intruding into the exterior member from the outside even if the sand etc. tries to intrude. Accordingly, when the exterior end portion cap according to the invention is used, an effect that sand etc. can be prevented from easily intruding into the exterior member is obtained, in comparison with a case where, for example, only taping is applied. According to the invention as understood from the above description, since the sand etc. is absent from the inside of the exterior member, an effect that the electrically conductive paths can be prevented from being damaged easily is obtained even when the electrically conductive paths shake, for example, due to vibration during running. Moreover, according to the invention, since the exterior end portion cap having the two-part structure is used, an effect that the exterior end portion cap can be easily attached to the electrically conductive paths arranged side by side is also obtained. In addition, according to the invention, an effect that the electrically conductive paths can be retained in an immovable state or an effect that the electrically conductive paths can be disposed substantially at the center of the exterior member is also obtained.

According to the above configuration of the invention, the wire harness is configured to include the exterior end portion cap. With this configuration, for example, sand etc. can be prevented from intruding into the exterior member from the outside even if the sand etc. tries to intrude. As a result, an effect that damage on the electrically conductive paths inside the exterior member can be prevented is obtained.

BRIEF DESCRIPTION OF THE DRAWINGS

FIGS. 7A and 7B are views of the exterior end portion cap in FIG. 3, FIG. 7A being a view seen from a direction of an arrow C of FIG. 6A, FIG. 7B being a view seen from a direction of an arrow D of FIG. 6A.

DETAILED DESCRIPTION OF THE EXEMPLARY EMBODIMENTS

A wire harness is configured to include an exterior member shaped like a tubular body, at least two electrically conductive paths protected by the exterior member, and exterior end portion caps. Each of the exterior end portion caps is a member having a two-part structure. The exterior end portion caps are attached to end portions of the exterior member out of which the electrically conductive paths are led. An external exposure portion having first blocking portions, and an internal insertion portion having second blocking portions are formed in each of such exterior end portion caps. The first blocking portions are formed into planarly shaped portions which abut against the corresponding end portion of the exterior member. The second blocking portions are formed into convexly shaped portions fitted to gaps between the electrically conductive paths arranged side by side. A pair of electrically conductive path exposing slits by which portions of outer surfaces of the electrically conductive paths are made to function as third blocking portions are also formed at positions of divided surfaces in the internal insertion portion.

Example

Figure 1A:
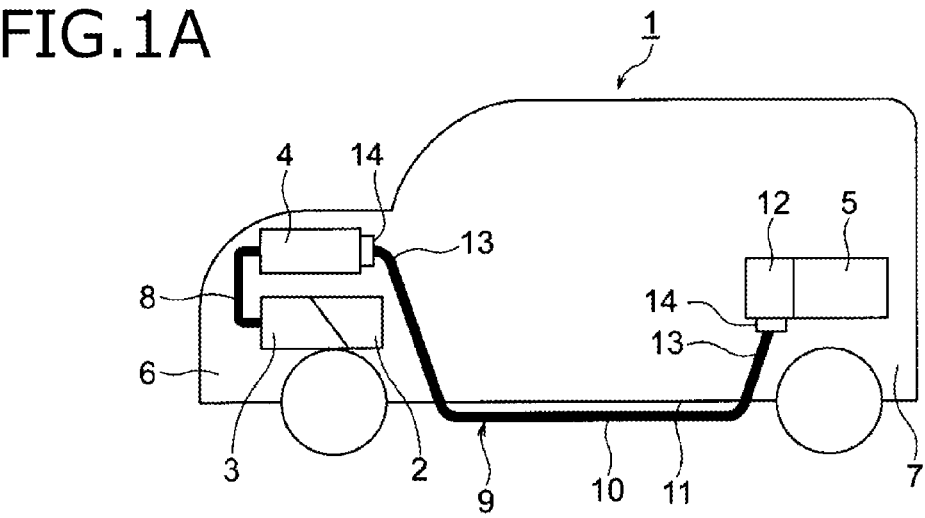
FIGS. 1A and 1B are views showing wire harnesses according to the invention, FIG. 1A being a schematic view showing a state in which high-voltage wire harnesses are routed, FIG. 1B being a schematic view showing a state in which a low-voltage wire harness different from those in FIG. 1A is routed.
Figure 1B:
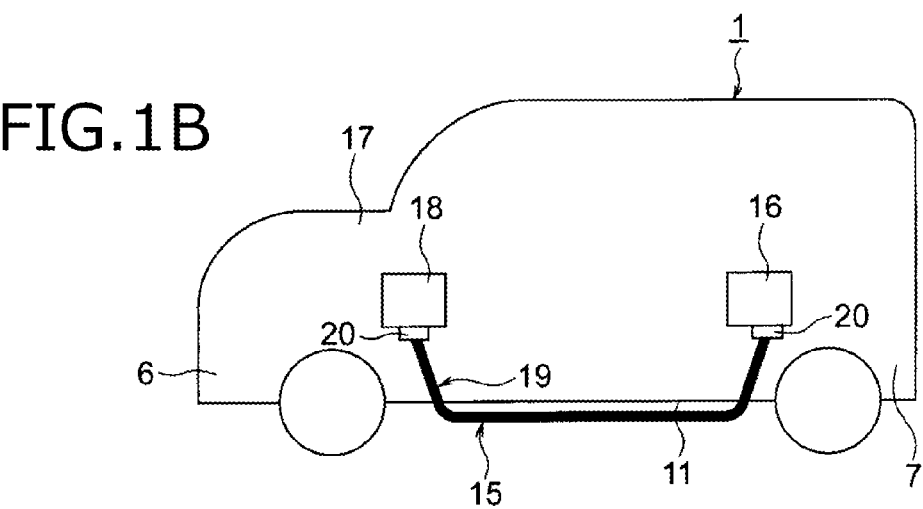
Figure 2:
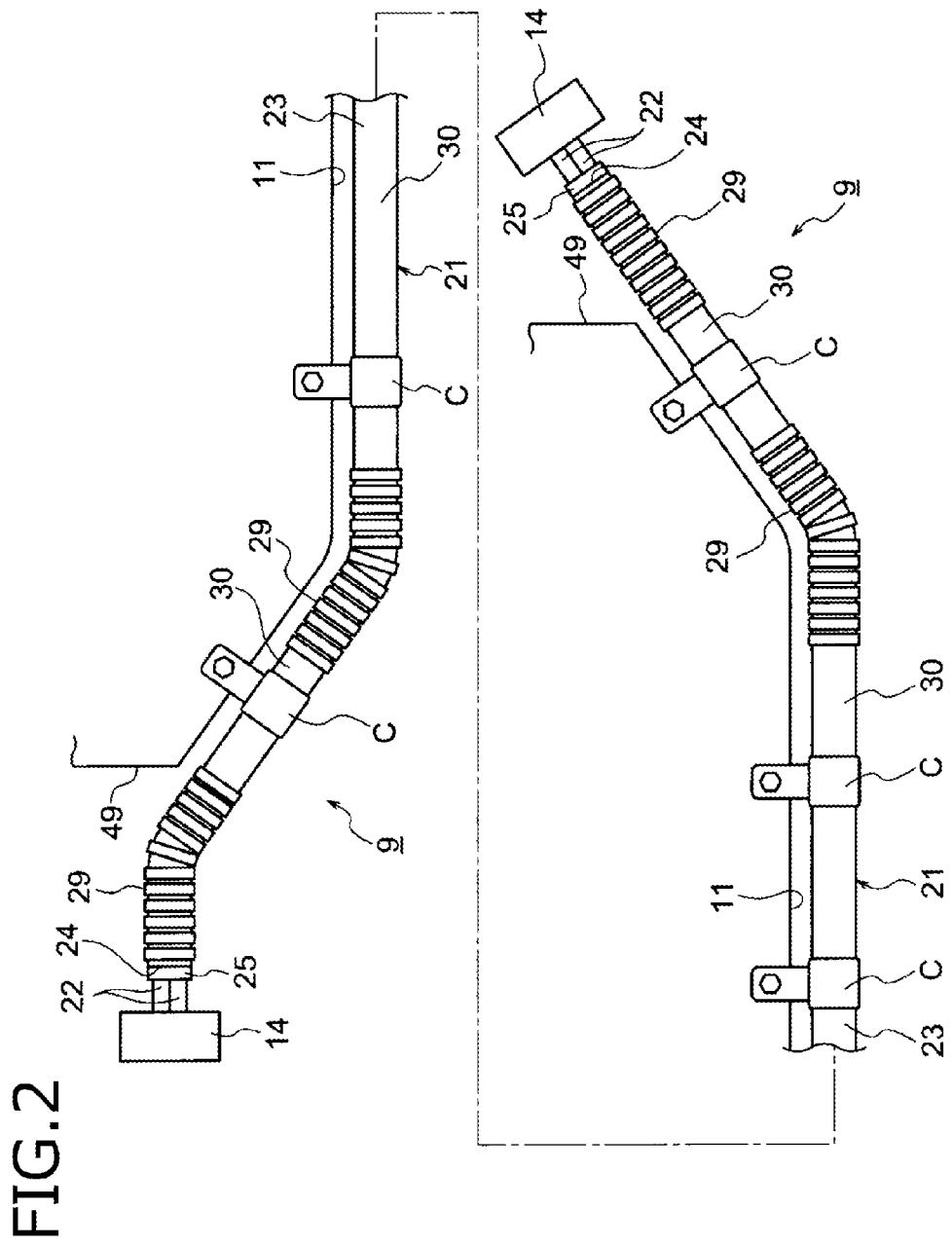
FIG. 2 is a view showing a state in which a path of one of the wire harnesses in FIG. 1A is routed, and the configuration of the wire harness in FIG. 1A.
Figure 3:
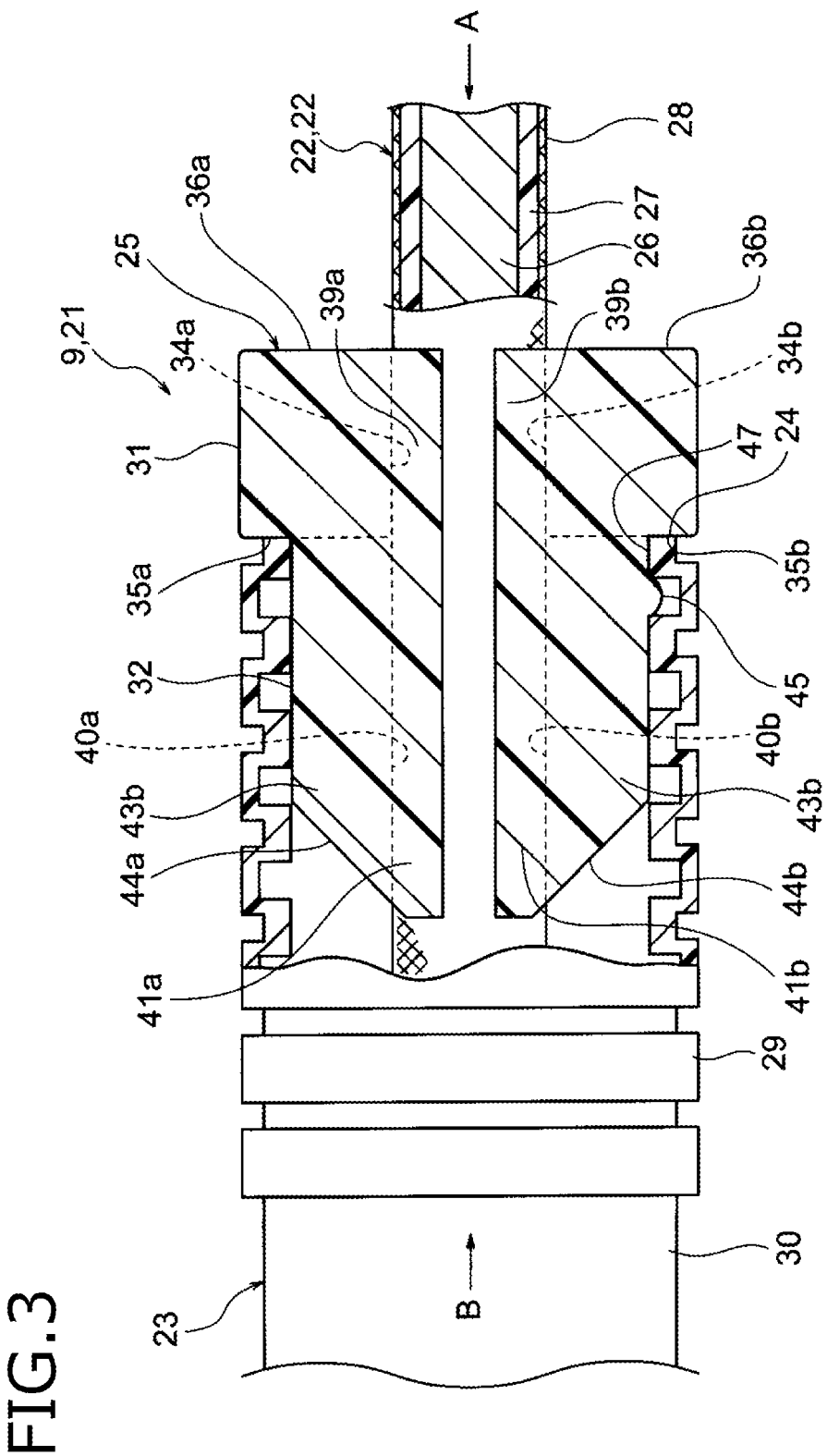
FIG. 3 is a longitudinal sectional view showing the configuration of an exterior end portion cap according to the invention in a harness terminal in FIG. 2.

Example will be described below with reference to the drawings. FIGS. 1A and 1B are views showing wire harnesses according to the invention. FIG. 1A is a schematic view showing a state in which high-voltage wire harnesses are routed. FIG. 1B is a schematic view showing a state in which a low-voltage wire harness different from those in FIG. 1A is routed. FIG. 2 is a view showing a state in which a path of one of the wire harnesses in FIG. 1A is routed, and the configuration of the wire harness in FIG. 1A. FIG. 3 is a longitudinal sectional view showing the configuration of an exterior end portion cap according to the invention in a harness terminal in FIG. 2.

Figure 4:
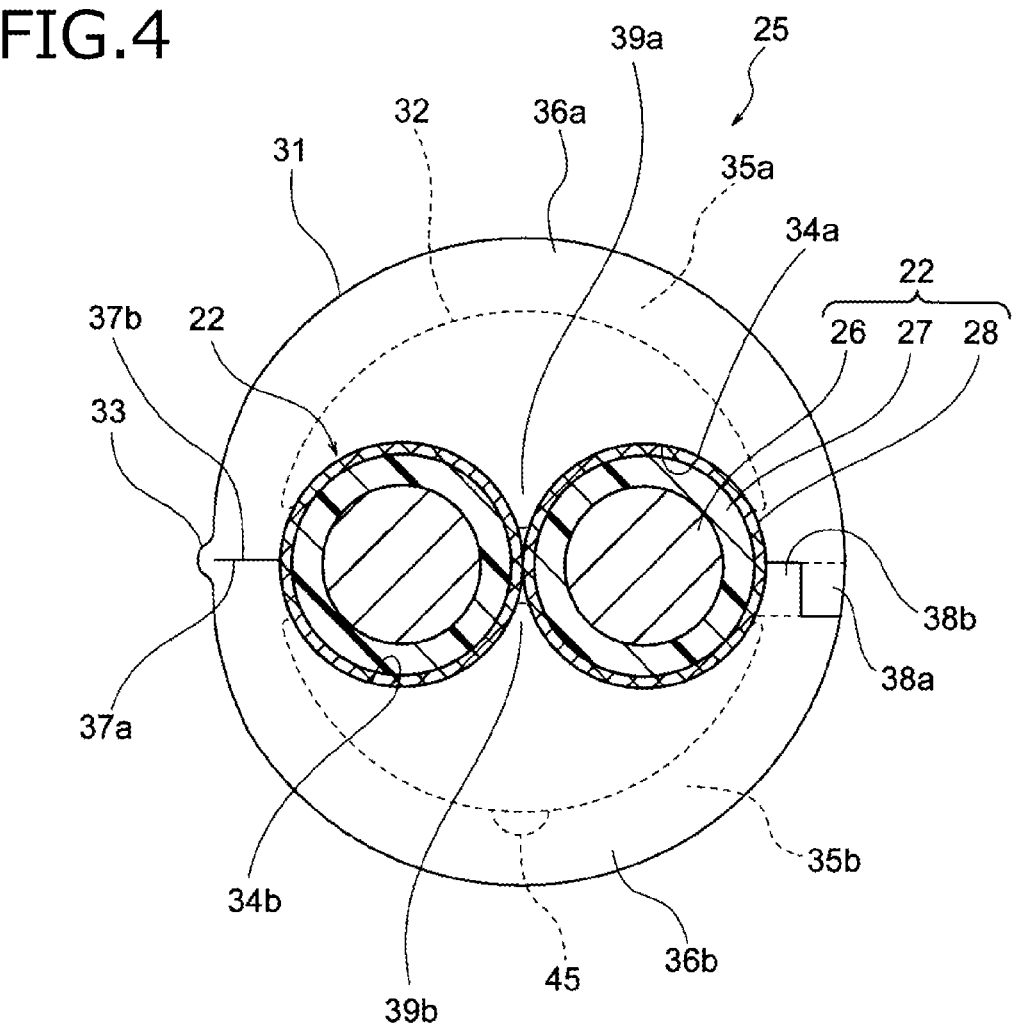
FIG. 4 is a view seen from a direction of an arrow A of FIG. 3.
Figure 5:
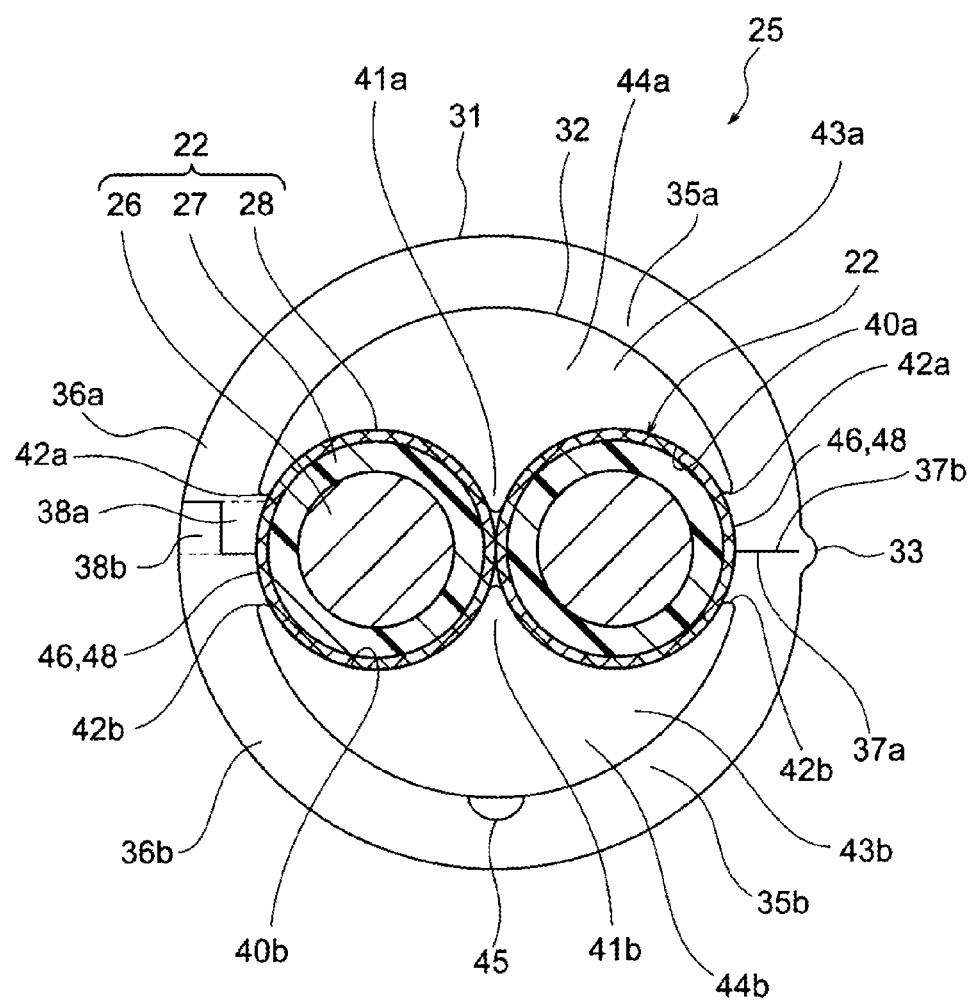
FIG. 5 is a view seen from a direction of an arrow B of FIG. 3.
Figure 6A:
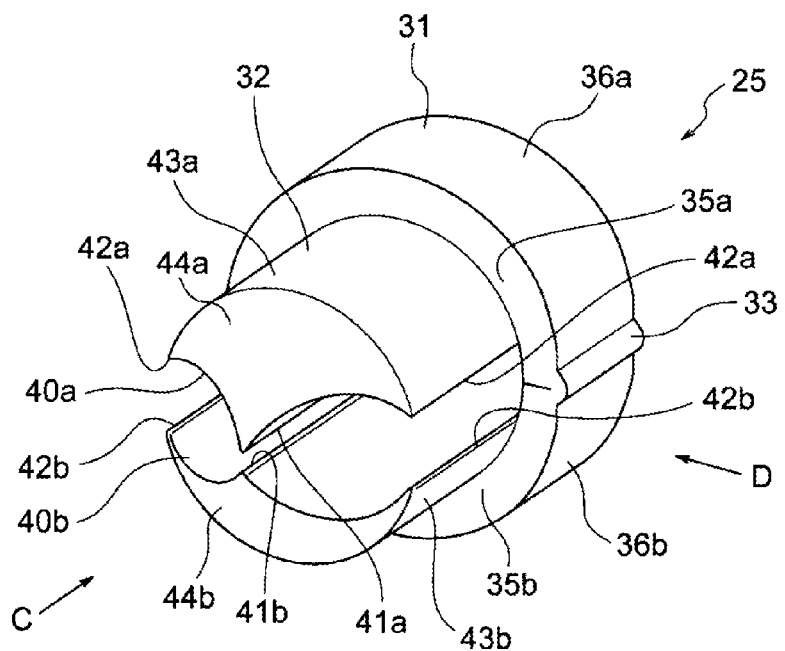
FIGS. 6A and 6B are views of the exterior end portion cap in FIG. 3, FIG. 6A being a perspective view, FIG. 6B being a perspective view of a divided state.
Figure 6B:
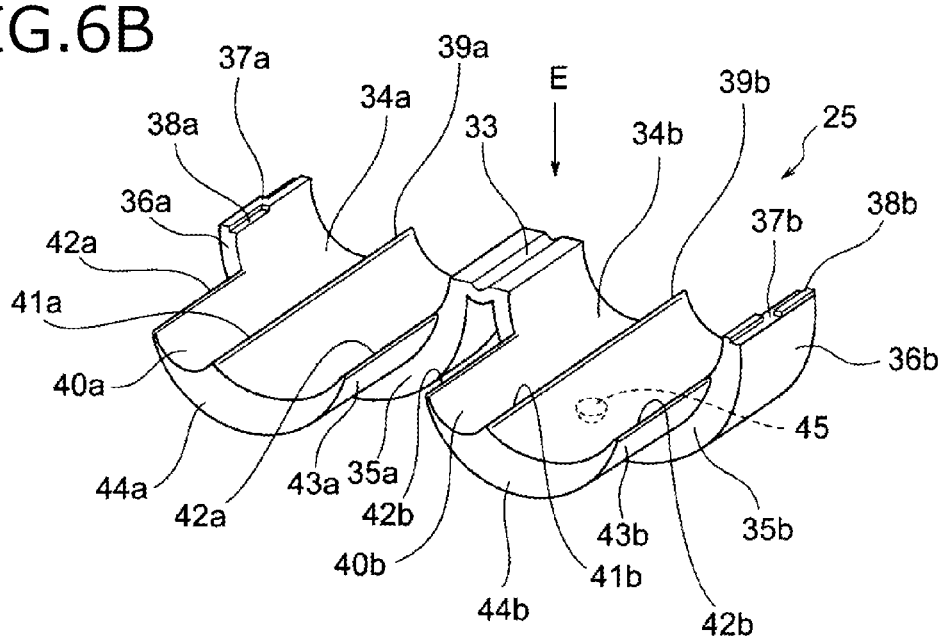
Figure 8:
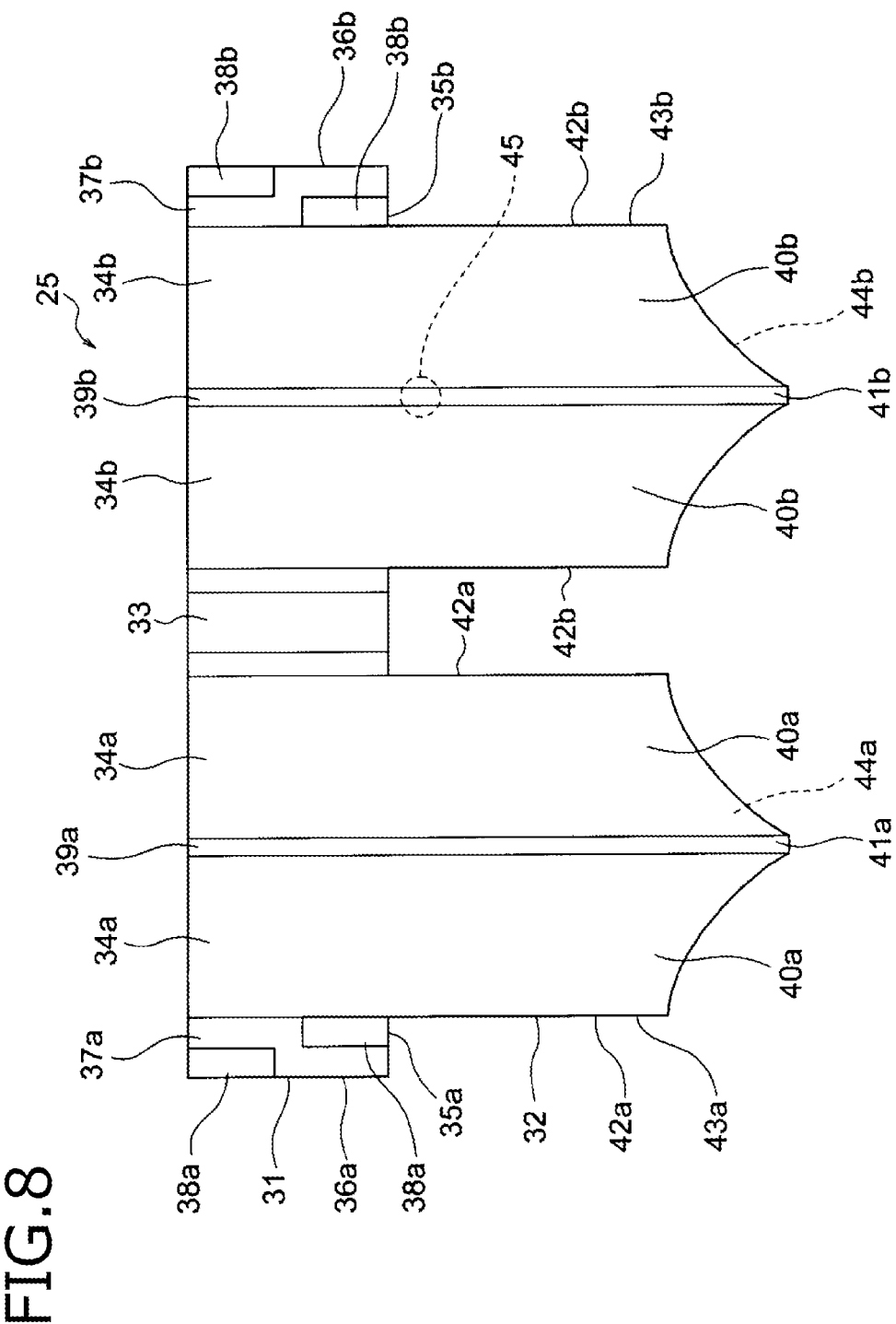
FIG. 8 is a view seen from a direction of an arrow E of FIG. 6B.
Figure 9:
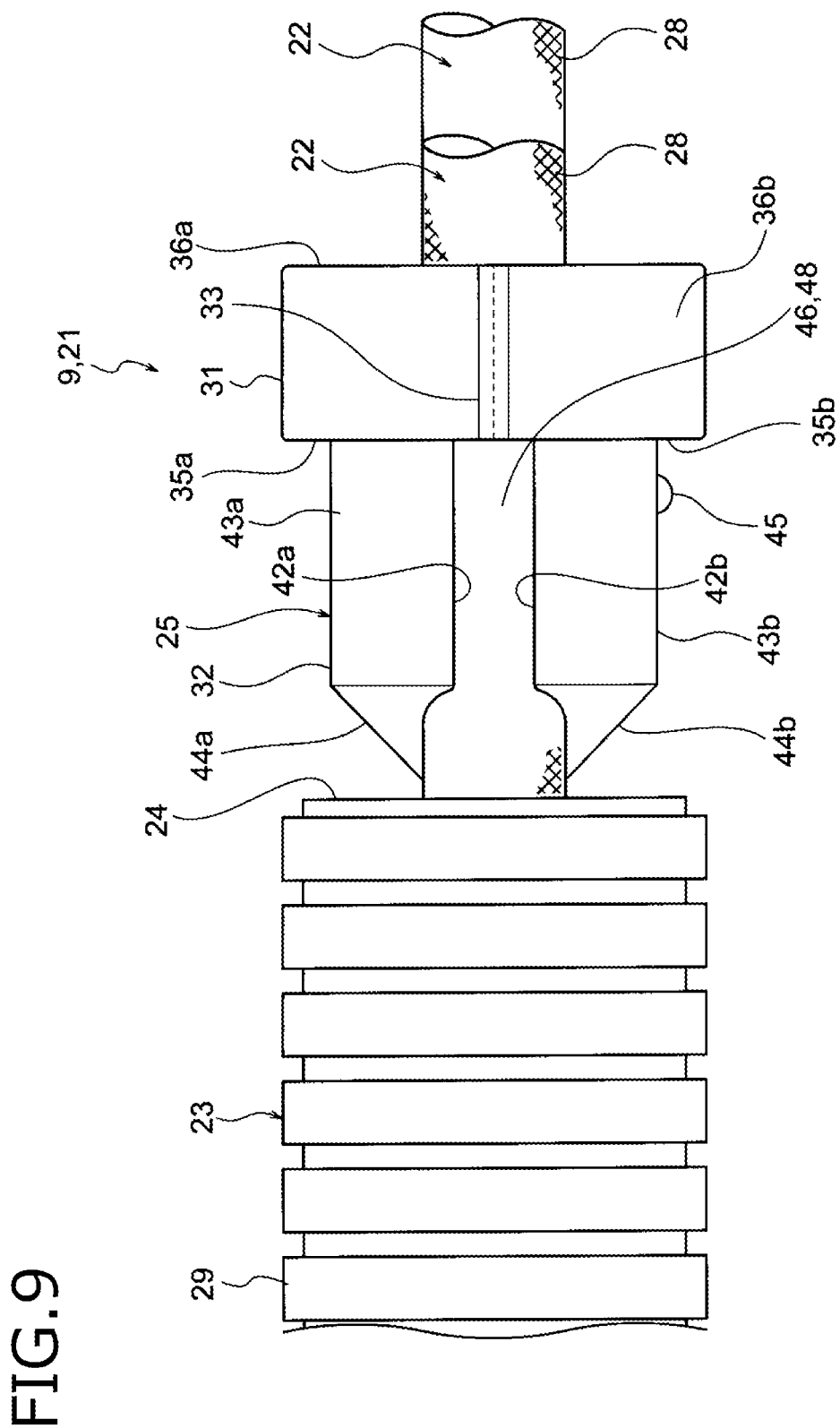
FIG. 9 is a view showing a state immediately before the exterior end portion cap is attached to an end portion of an exterior member.
Figure 10:
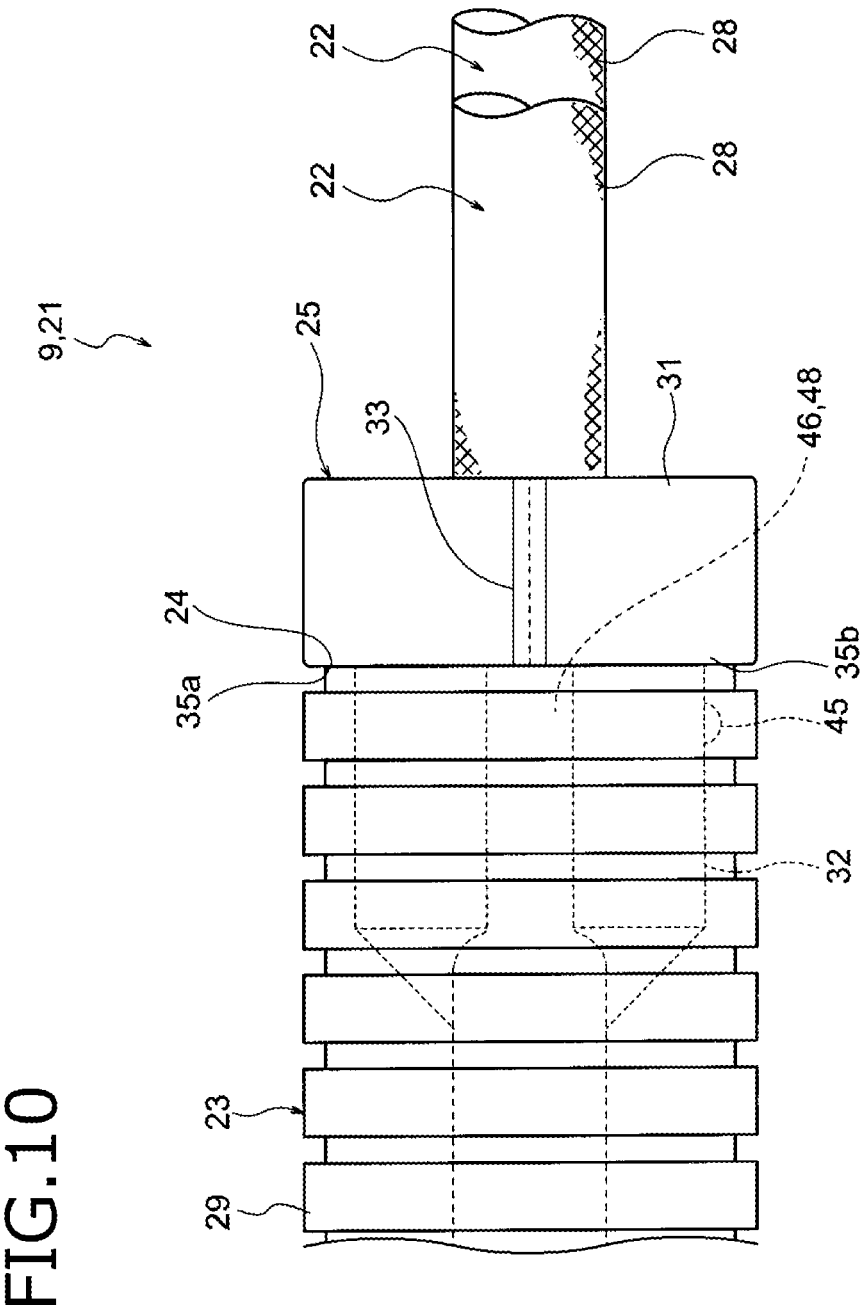
FIG. 10 is a view showing a state in which the exterior end portion cap has been attached to the end portion of the exterior member.
Figure 11:
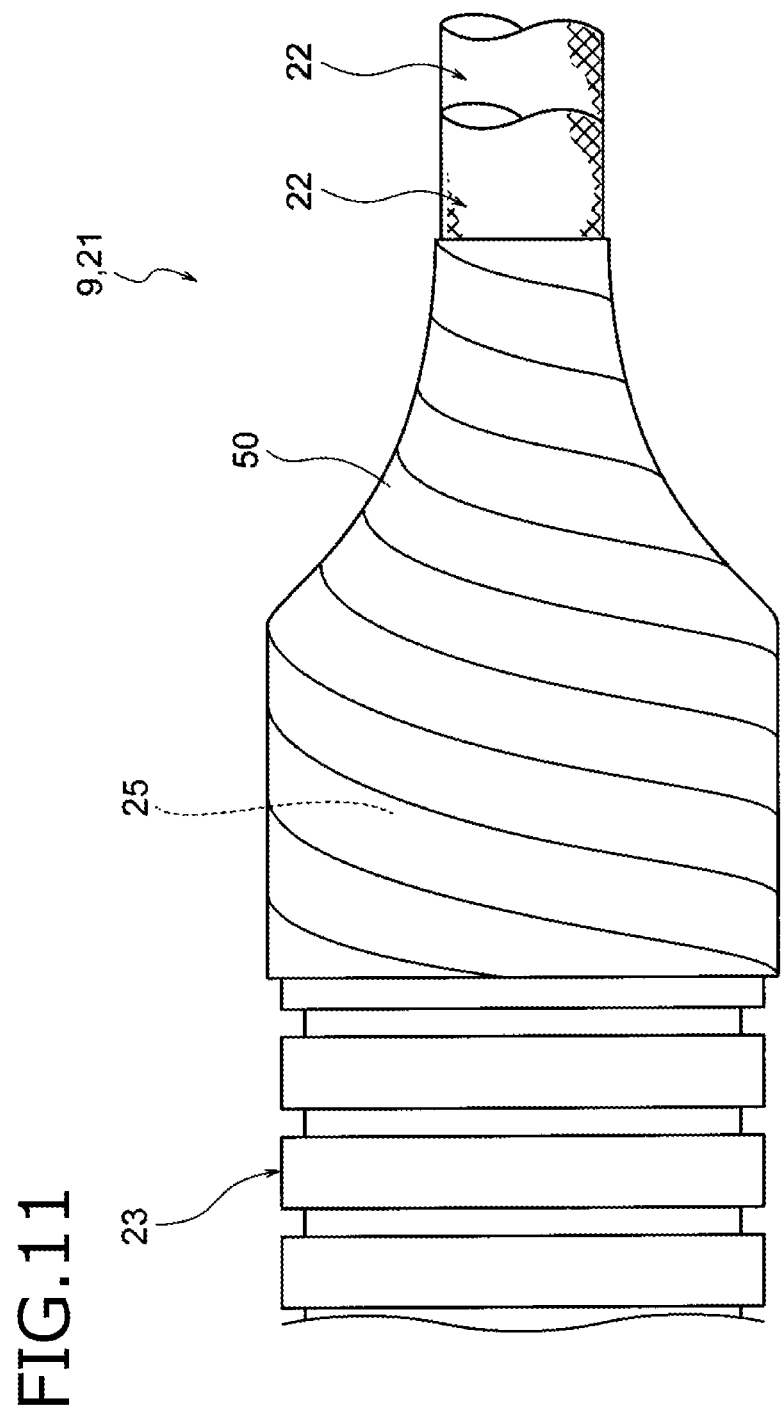
FIG. 11 is a view showing a modification, in which taping is applied to the state of FIG. 10.
Figure 12:
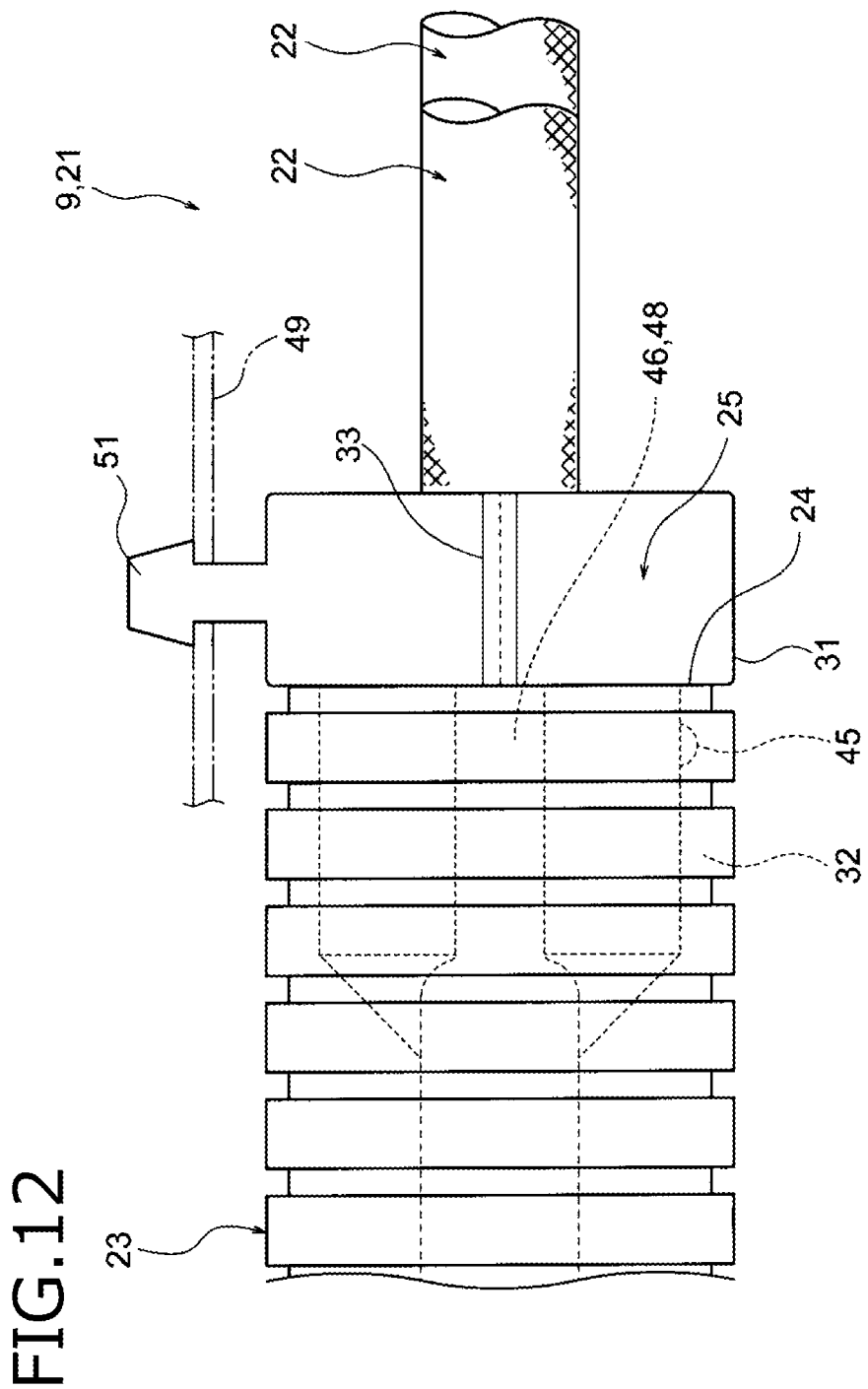
FIG. 12 is a view showing a modification, in which a clip portion serving as a fixation piece is provided integrally on an outer surface of an external exposure portion.

FIG. 4 is a view seen from a direction of an arrow A of FIG. 3. FIG. 5 is a view seen from a direction of an arrow B of FIG. 3. FIGS. 6A and 6B, FIGS. 7A and 7B and FIG. 8 are views of the exterior end portion cap. FIG. 9 is a view showing a state immediately before the exterior end portion cap is attached to an end portion of an exterior member. FIG. 10 is a view showing a state in which the exterior end portion cap has been attached to the end portion of the exterior member. FIGS. 11 and 12 are views showing modifications.

The motor unit 3 is configured to include a motor and a generator. In addition, the inverter unit 4 is configured to include an inverter and a converter. The motor unit 3 is formed as a motor assembly including a shielding case. In addition, the inverter unit 4 is also formed as an inverter assembly including a shielding case. The battery 5 is of an Ni—MH type or an Li-ion type which is formed to be modularized. Incidentally, an electric storage device such as a capacitor may be used. It is a matter of course that any device may be used as the battery 5 without any particular limitation as long as the device can be used in the hybrid car 1 or an electric car.

In FIG. 1B, the reference sign 15 designates a wire harness. The wire harness 15 is a low-voltage wire harness (for low voltage use) which is provided for electrically connecting a low-voltage battery 16 of the car rear portion 7 in the hybrid car 1 to an accessory 18 (device) mounted in a car front portion 17. The wire harness 15 is routed to pass through the vehicle underfloor 11 in the same manner as the wire harness 9 in FIG. 1A (This is merely an example. The wire harness 15 may be routed to pass through the cabin side). The reference sign 19 in the wire harness 15 designates a harness body. In addition, the reference sign 20 designates a connector.

As shown in FIGS. 1A and 1B, the high-voltage wire harnesses 8 and 9 and the low-voltage wire harness 15 are routed in the hybrid car 1. The invention can be applied to any of these wire harnesses. However, the high-voltage wire harness 9 will be taken as a representative example and described below. The configuration and the structure of the wire harness 9 will be described first.

<About Configuration of Wire Harness 9>

In FIG. 1A and FIG. 2, the long wire harness 9 routed to pass through the vehicle underfloor 11 is configured to include a harness body 21 and the shield connectors 14 (external connection pieces) which are provided and disposed on the opposite terminals (harness terminals 13) of the harness body 21 respectively. In addition, the wire harness 9 is configured to include clamps C for routing the wire harness 9 to predetermined positions, and not-shown water sealing members (e.g. grommets etc.).

<About Configuration of Harness Body 21>

In FIG. 2 and FIG. 3, the harness body 21 is configured to include a long electrically conductive path 22, an exterior member 23 which houses and protects the electrically conductive path 22, and exterior end portion caps 25 according to the invention which are attached to end portions 24 of the exterior member 23 out of which the electrically conductive path 22 is led.

<About Electrically Conductive Path 22>

In FIG. 3 and FIG. 6, the electrically conductive path 22 is configured to include an electrically conductive conductor 26, an insulating insulator 27 with which the conductor is coated, a braid 28 (shield member) which is provided for fulfilling a shield function. That is, an electrically conductive path from which a sheath is absent (this is merely an example) is used as the electrically conductive path 22. Due to absence of the sheath from the electrically conductive path 22, it is a matter of course that the electrically conductive path 22 is light in weight accordingly (Since the electrically conductive path 22 is long, it is a matter of course that the weight of the electrically conductive path 22 can be reduced much more greatly than a background-art example).

<About Conductor 26>

In FIG. 3 and FIG. 6, the conductor 26 is made of copper, a copper alloy, aluminum or an aluminum alloy and formed into a circular shape in section. The conductor 26 may be either a conductor having a conductor structure of twisted strands or a conductor having a sectionally circular (round) rod-like conductor structure (e.g. a conductor structure which serves as a round single core. In this case, the electrically conductive path itself is also shaped like a rod). The insulator 27 made of an insulating resin material is formed on an outer surface of the conductor 26 by extrusion molding.

<About Insulator 27>

In FIG. 3 and FIG. 6, the insulator 27 is formed on the outer circumferential surface of the conductor 26 by extrusion molding out of a thermoplastic resin material. The insulator 27 is formed as a coating shaped like a circle in section. The insulator 27 is formed to have a predetermined thickness. Various known kinds of resins can be used as the aforementioned thermoplastic resin. For example, the thermoplastic resin may be selected suitably from high polymer materials such as a polyvinylchloride resin, a polyethylene resin and a polypropylene resin.

<About Configuration of Harness Body 21>

In FIG. 2 and FIG. 3, the harness body 21 is configured to include two long electrically conductive paths 22, an exterior member 23, and exterior end portion caps 25 according to the invention. The exterior member 23 houses and protects the two electrically conductive paths 22. The exterior end portion caps 25 according to the invention are attached to end portions 24 of the exterior member 23 out of which the two electrically conductive paths 22 are led. Incidentally, the number of the electrically conductive paths 22 is exemplary to be at least two.

The braid 28 according to the Example is the outermost layer of the electrically conductive path 22. Accordingly, one portion of the electrically conductive path 22 functions as a "third blocking portion" described in Claims (its details and reference sign will be described later).

<About Exterior Member 23>

In FIG. 2 and FIG. 3, the exterior member 23 is formed into a straight tubular body shape (which is straight prior to use) by molding out of an insulating resin. In addition, the exterior member 23 is formed into an unslitted shape (in other words, formed into a shape having no slit (or formed into a shape which is not a split tube shape)). Further, the exterior member 23 is formed into a sectionally circular shape suited to shape of the electrically conductive path 22.

Such an exterior member 23 has flexible pipe portions 29 having flexibility, and straight pipe portions 30 serving as portions where the electrically conductive path 22 is routed straightly (This configuration is merely an example. For example, the entire exterior member 23 may be a flexible pipe portion 29). The flexible pipe portions 29 and the straight pipe portions 30 are formed in a pipe axial direction. In addition, the flexible pipe portions 29 and the straight pipe portions 30 are formed and disposed alternately.

<About Flexible Pipe Portions 29>

In FIG. 2 and FIG. 3, the flexible pipe portions 29 are disposed in accordance with a vehicle attachment shape (a shape of a destination to which the wire harness is routed, or a shape of an attachment subject 49 which will be described later). In addition, the flexible pipe portions 29 are formed to also have lengths suited to the vehicle attachment shape. The lengths of the flexible pipe portions 29 are not fixed but may be formed as required lengths suited to the vehicle attachment shape respectively. Such flexible pipe portions 29 are formed to be able to be flexed at desired angles respectively in a packed state and during transportation of the wire harness 9, and further during routing of a path of the wire harness 9 in the vehicle. That is, the flexible pipe portions 29 are formed to be able to be flexed into bent shapes, and, of course, to be able to be returned to their original straight states (the states when the resin is molded). Each of the flexible pipe portions 29 according to the Example is formed into a corrugated pipe shape having bellows recesses and bellows protrusions (this is merely an example).

<About Straight Pipe Portions 30>

In FIG. 2 and FIG. 3, the straight pipe portions 30 are formed as portions which do not have flexibility like the flexible pipe portions 29. In addition, the straight pipe portions 30 are formed also as portions which do not bend in the packed state, during the transportation, and further during the routing of the path (the non-bending portions mean portions which do not have flexibility aggressively). The straight pipe portions 30 are formed into long straight pipe shapes. Each of outer circumferential surfaces of such straight pipe portions 30 is formed into a smooth shape (this is merely an example).

The straight pipe portions 30 are formed into rigid portions in comparison with the flexible pipe portions 29. Each of such straight pipe portions 30 is formed at a position with a length in accordance with the vehicle attachment shape.

Incidentally, of the straight pipe portions 30, a longest one 30 is formed as a portion disposed on the vehicle underfloor 11 in the Example.

<About Exterior End Portion Cap 25>

In FIGS. 2 to 8, the exterior end portion cap 25 is a resin molded item which is, for example, made of a resin material having weather resistance, heat resistance, etc. The exterior end portion cap 25 is not only attached to one electrically conductive path 22 but also attached to the exterior member 23 out of which the electrically conductive path 22 is led. The exterior end portion cap 25 is provided, for example, for preventing sand etc. from intruding into (an internal portion of) the exterior member 23 from the outside even if the sand etc. tries to intrude. In addition, the exterior end portion cap 25 is provided also for preventing damage on the electrically conductive path 22 inside the exterior member 23. An external exposure portion 31, an internal insertion portion 32 which is continuous to the external exposure portion 31, and an electrically conductive path housing recess which extends across the external exposure portion 31 and the internal insertion portion 32 are formed in such an exterior end portion cap 25.

<About External Exposure Portion 31>

In FIGS. 3 to 8, the external exposure portion 31 is formed as a portion exposed to an outer side of the exterior member 23. The external exposure portion 31 is formed to be larger in size than the end portion 24 of the exterior member 23. In addition, the external exposure portion 31 is also formed into a size large enough so that a worker can hold the external exposure portion 31 in his/her hand so as to perform insertion work of the exterior end portion cap 25 into the exterior member 23. Such an external exposure portion 31 is formed substantially into a U-shape in section due to the presence of the electrically conductive path housing recess. A first blocking portion 34 is formed in the external exposure portion 31. The first blocking portion 34 is formed as one of characteristic portions of the invention.

<About First Blocking Portion 34>

In FIGS. 3 to 8, the first blocking portion 34 is formed and disposed on a side opposed to the end portion 24 of the exterior member 23. The first blocking portion 34 is formed into a plane which can abut against the end portion 24 to block the end portion 24 at the abutment portion (The first blocking portion 34 is formed into a planar shape. In addition thereto, the first blocking portion 34 may alternatively have a groove shape or a step shape into which the end portion 24 can be inserted).

Incidentally, in the Example, a bellows recess portion of the exterior member 23 is formed as the end portion 24. However, the invention is not limited thereto. Alternatively, a bellows protrusion portion of the exterior member 23 may serve as the end portion 24. The first blocking portion 34 is formed as a portion which abuts against such an end portion 24 to prevent, for example, sand etc. from intruding into (the internal portion of) the exterior member 23 from the outside even if the sand etc. tries to intrude.

<About Exterior End Portion Cap 25>

In FIGS. 3 to 10, the exterior end portion cap 25 is a resin molded item which is, for example, made of a resin material having weather resistance, heat resistance, etc. The exterior end portion cap 25 is not only attached to the two electrically conductive paths 22 but also attached to the exterior member 23 out of which the electrically conductive paths 22 are led. In the Example, the exterior end portion cap 25 is attached to the exterior member 23 without looseness (the exterior end portion cap 25 may be slightly press-fitted into the exterior member 23). The exterior end portion cap 25 is provided, for example, for preventing sand etc. from intruding into (an internal portion of) the exterior member 23 from the outside even if the sand etc. tries to intrude. In addition, the exterior end portion cap 25 is provided also for preventing damage on the electrically conductive paths 22 inside the exterior member 23. An external exposure portion 31 and an internal insertion portion 32 which is continuous to the external exposure portion 31 are formed in such an exterior end portion cap 25. The exterior end portion cap 25 according to the Example is formed into a two-part structure in which two divided parts of the exterior end portion cap 25 are connected to each other through a hinge 33.

<About External Exposure Portion 31>

In FIGS. 3 to 10, the external exposure portion 31 is formed into a substantially circularly columnar (or substantially disk-like) portion exposed to the outer side of the exterior member 23. The external exposure portion 31 is formed to have a diameter not smaller than an external diameter of the end portion 24 of the exterior member 23. In addition, the external exposure portion 31 is formed to be also thick enough so that a worker can hold the external exposure portion 31 in his/her hand so as to perform insertion work of the exterior end portion cap 25 into the exterior member 23. Electrically conductive path penetrating portions 34a and 34b and first blocking portions 35a and 35b are formed in such an external exposure portion 31. The two electrically conductive paths 22 penetrate the electrically conductive path penetrating portions 34a and 34b. The first blocking portions 35a and 35b abut against the end portion 24 of the exterior member 23 to block the end portion 24 of the exterior member 23. Incidentally, the reason why the reference signs are separated into one suffixed with "a" and the other suffixed with "b" is that the exterior end portion cap 25 has the two-part structure as described above, and the external exposure portion 31 is therefore also formed into a two-part structure (two-divided structure). In the external exposure portion 31, the reference sign 36a designates an upper divided part and the reference sign 36b designates a lower divided part. The upper divided part 36a and the lower divided part 36b are formed into semicircular shapes respectively (shapes viewed from the direction of the arrow A in FIG. 3) so as to be connected to each other through the hinge 33. Engagement portions 38a and 38b are formed in divided surfaces 37a and 37b generated due to the two-part structure.

<About External Exposure Portion 31 and Electrically Conductive Path Penetrating Portions 34a and 34b>

In FIG. 4, FIGS. 6A and 6B, FIGS. 7A and 7B and FIG. 8, the external exposure portion 31 is formed into a shape with which the external exposure portion 31 can hold the two electrically conductive paths 22 in a state in which the two electrically conductive paths 22 are arranged side by side adjacently. In addition, the electrically conductive path penetrating portions 34a and 34b are formed into shapes with which the electrically conductive path penetrating portions 34a and 34b make contact with (tight contact with) the outermost layers (braids 28) of the electrically conductive paths 22. Therefore, the electrically conductive path penetrating portions 34a and 34b are formed into semicircular recesses respectively. The electrically conductive path penetrating portions 34a and 34b are formed as portions which do not cause looseness in the two electrically conductive paths 22. Incidentally, the reference signs 39a and 39b designate second blocking portion extension parts.

<About Second Blocking Portion Extension Parts 39a and 39b>

In FIG. 3, FIG. 4, FIG. 6B and FIG. 8, the second blocking portion extension parts 39a and 39b are parts in which second blocking portions 41a and 41b which will be described later are extended to the position of the external exposure portion 31. The second blocking portion extension parts 39a and 39b are formed into convex shapes fitted to gaps between the two electrically conductive paths 22 arranged side by side (gaps generated like approximate ginkgo leaf shapes in section between the two electrically conductive paths 22 when the two electrically conductive paths 22 are arranged side by side). The second blocking portion extension parts 39a and 39b are formed as the same function portions as the second blocking portions 41a and 41b which will be described later. Incidentally, since the second blocking portions 41a and 41b which will be described later are provided, formation of the second blocking portion extension parts 39a and 39b may be optional (it is a matter of course that it is preferred to form the second blocking portion extension parts 39a and 39b).

<About First Blocking Portions 35a and 35b>

In FIGS. 3 to 5, FIGS. 6A and 6B and FIGS. 7A and 7B, the first blocking portions 35a and 35b serving as a characteristic portion of the invention are disposed on a side opposed to the end portion 24 of the exterior member 23. The first blocking portions 35a and 35b are formed as portions which abut against the end portion 24 to block the end portion 24, as described above. The first blocking portions 35a and 35b are formed into annular planes (formed into planar shapes. In addition thereto, the first blocking portions 35a and 35b may have annular groove shapes or annular step shapes into which the end portion 24 can be inserted).

Incidentally, in the Example, a bellows recess portion of the exterior member 23 is formed as the end portion 24. However, the invention is not limited thereto. Alternatively, a bellows protrusion portion of the exterior member 23 may serve as the end portion 24. The first blocking portions 35a and 35b are formed as portions which prevent, for example, sand etc. from intruding into (the internal portion of) the exterior member 23 from the outside even if the sand etc. tries to intrude.

<About Engagement Portions 38a and 38b>

In FIGS. 4 to 8, the engagement portions 38a and 38b are formed as concavely and convexly shaped portions disposed on the divided surfaces 37a and 37b. The concavely and convexly shaped engagement portions 38a and 38 can be engaged with each other respectively, for example, by press fitting, so as to maintain a surface contact state between the divided surfaces 37a and 37b. The engagement portions 38a and 38b are formed as portions for restraining the external exposure portion 31 from returning to its divided state even when the hinge 33 is broken (As long as the external exposure portion 31 can be restrained from returning to its divided state, the state in which sand etc. is prevented from intruding into the exterior member 23 can be maintained). Incidentally, the illustrated shapes of the engagement portions 38a and 38b are exemplary. As long as the engagement portions 38a and 38b can retrain the external exposure portion 31 from returning to its divided state, the shapes of the engagement portions 38a and 38b is not limited particularly. The engagement portions 38a and 38b according to the Example are formed in positions opposite to and separate from the hinge 33.

<About Internal Insertion Portion 32>

In FIGS. 3 to 10, the internal insertion portion 32 is continuous to the external exposure portion 31 and formed into a substantially circularly columnar portion which is smaller in diameter than the external exposure portion 31. In addition, the internal insertion portion 32 is formed as a portion which has a diameter fitted to an internal diameter of the end portion 24 of the exterior member 23, and which is inserted into the exterior member 23. Electrically conductive path penetrating portions 40a and 40b which are penetrated by the two electrically conductive paths 22, the second blocking portions 41a and 41b which are continuous to the electrically conductive path penetrating portions 40a and 40b, and a pair of electrically conductive path exposing slits 42a and 42b are formed in such an internal insertion portion 32. Incidentally, the reason why the reference signs are separated into one suffixed with "a" and the other suffixed with "b" is that the exterior end portion cap 25 has the two-part structure as described above, and the internal insertion portion 32 is therefore also formed into a two-part structure (two-divided structure). In the internal insertion portion 32, the reference sign 43a designates an upper divided part, and the reference sign 43b designates a lower divided part. The upper divided part 43a and the lower divided part 43b are formed, for example, into substantially semicircularly columnar shapes respectively.

Tapered surfaces 44a and 44b guided by the end portion 24 of the exterior member 23 are formed at insertion front end portions of the internal insertion portion 32 inserted into the exterior member 23. In addition, a detachment preventing portion 45 hooked on an inner surface of the exterior member 23 is formed at one place on an outer surface of the internal insertion portion 32.

<About Internal Insertion Portion 32 and Electrically Conductive Path Penetrating Portions 40a and 40b>

In FIGS. 5 to 8, the internal insertion portion 32 is formed into a shape with which the internal insertion portion 32 can hold the two electrically conductive paths 22 in a state in which the two electrically conductive paths 22 are arranged side by side adjacently. In addition, the electrically conductive path penetrating portions 40a and 40b are formed into shapes with which the electrically conductive path penetrating portions 40a and 40b make contact with (make tight contact with) the outermost layers (braids 28) of the electrically conductive paths 22. The electrically conductive path penetrating portions 40a and 40b are formed into shapes of semicircular recesses respectively. In addition, the electrically conductive path penetrating portions 40a and 40b are also formed into shapes serving as retention portions which do not cause looseness in the two electrically conductive paths 22.

<About Second Blocking Portions 41a and 41b>

In FIG. 3 and FIGS. 5 to 8, the second blocking portions 41a and 41b serving as a characteristic portion of the invention are formed and disposed to be continuous to the electrically conductive path penetrating portions 40a and 40b, as described above. In addition, the second blocking portions 41a and 41b are formed so that the second blocking portion extension parts 39a and 39b in the external exposure portion 31 are also continuous to the second blocking portions 41a and 41b. The second blocking portions 41a and 41b are formed into convex shapes fitted to the gaps between the two electrically conductive paths 22 arranged side by side (the gaps generated like approximate ginkgo leaf shapes in section between the two electrically conductive paths 22 when the two electrically conductive paths 22 are arranged side by side). The second blocking portions 41a and 41b are formed as portions which prevent, for example, sand etc. from intruding into (the internal portion of) the exterior member 23 from the outside (from the aforementioned gaps) even if the sand etc. tries to intrude.

<About One Pair of Electrically Conductive Path Exposing Slits 42a and 42b>

In FIGS. 4 and 5, FIGS. 6A and 6B, FIGS. 7A and 7B, and FIGS. 9 and 10, the pair of electrically conductive path exposing slits 42a and 42b serving as a characteristic portion of the invention are formed as portions which can expose portions 46 of the outermost layers (braids 28) of the electrically conductive paths 22 in line with the positions of the divided surfaces 37a and 37b and in a pipe axial direction. In addition, the pair of electrically conductive path exposing slits 42a and 42b are formed also as portions in which the portions 46 can be brought into contact with an inner surface 47 of the exterior member 23 present in the vicinity of the end portion 24. In the Example, the pair of electrically conductive path exposing slits 42a and 42b are formed and disposed all over positions of two, left and right side portions of the internal insertion portion 32. The pair of electrically conductive path exposing slits 42a and 42b are formed into the illustrated slit shapes. Such a pair of electrically conductive path exposing slits 42a and 42b are formed as portions for making the portions 46 of the electrically conductive paths 22 function as third blocking portions 48.

Incidentally, the function as the third blocking portions 48 is a function for preventing, for example, sand etc. from intruding into (the internal portion of) of the exterior member 23 from the outside even if the sand etc. tries to intrude. That is, the first blocking portions 35a and 35b, the second blocking portions 41a and 41b and the third blocking portions 48 have the same function.

The internal insertion portion 32 has a structure in which the portions 46 of the electrically conductive paths 22 are made to function as the third blocking portions 48. With this structure, the external diameter of the internal insertion portion 32 can be hence minimized. Therefore, it can be said that the internal insertion portion 32 has the structure effective in reducing the size.

<About Tapered Surfaces 44a and 44b>

In FIG. 3 and FIGS. 5 to 8, the tapered surfaces 44a and 44b are formed as portions guided by the end portion 24 of the exterior member 23, as described above, in order to contribute to reduction of an insertion load. The tapered surfaces 44a and 44b are formed to be inclined at a predetermined angle in each of the insertion front end portions of the internal insertion portion 32.

<About Detachment Preventing Portion 45>

In FIGS. 3 to 5, FIGS. 7A and 7B and FIGS. 9 and 10, the detachment preventing portion 45 is a convex portion hooked on the inner surface of the exterior member 23, as described above. In the Example, the detachment preventing portion 45 is formed into a semispherical shape (As long as the detachment preventing portion 45 can be hooked, the shape of the detachment preventing portion 45 is not limited particularly). The detachment preventing portion 45 is formed and disposed at only one place on the outer surface of the lower divided part 43b. In addition, the detachment preventing portion 45 is formed and disposed on a side near the external exposure portion 31. Incidentally, the reason why the detachment preventing portion 45 is formed at one place is that an insertion load imposed on the exterior member 23 can be reduced. In addition, the reason why the detachment preventing portion 45 is formed into the semispherical shape is also that the insertion load can be reduced.

<About Attachment of Exterior End Portion Cap 25>

In FIGS. 3 to 10, the exterior end portion cap 25 is attached to the two electrically conductive paths 22 arranged side by side, so as to hold predetermined positions of the two electrically conductive paths 22 from the illustrated upper and lower sides with the hinge 33 as a rotation center, and to engage the engagement portions 38a and 38b of the divided surfaces 37a and 37b with each other respectively when the exterior end portion cap 25 holds the predetermined positions of the two electrically conductive paths 22. On this occasion, the gaps between the two electrically conductive paths 22 arranged side by side are blocked by the second blocking portions 41a and 41b of the internal insertion portion 32 and the second blocking portion extension parts 39a and 39b of the external exposure portion 31.

The exterior end portion cap 25 is set into a state where it can be inserted from the insertion front end portion side of the internal insertion portion 32, i.e. from the side where the tapered surfaces 44a and 44b are provided. In such a state, the exterior end portion cap 25 is attached to the end portion 24 of the exterior member 23. To attach the exterior end portion cap 25 to the end portion 24, the outer surface (outer circumferential surface) of the internal insertion portion 32 and the portions 46 of the electrically conductive paths 22 exposed from the pair of electrically conductive path exposing slits 42a and 42b move while sliding against the inner surface 47 (pipe inner surface (inner circumferential surface)) of the exterior member 23. Then, the detachment preventing portion 45 of the internal insertion portion 32 passes through the end portion 24 of the exterior member 23 while slightly pushing and expanding the end portion 24, so that the detachment preventing portion 45 is fitted into the recess of the inner surface 47 of the exterior member 23. As soon as the detachment preventing portion 45 is hooked on the recess of the inner surface 47 to be prevented from being detached therefrom, the first blocking portions 35a and 35b of the external exposure portion 31 abut against (make surface contact with) the end portion 24 of the exterior member 23. That is, as shown in FIG. 3 and FIGS. 7A and 7B, the end portion 24 of the exterior member 23 is blocked by the first blocking portions 35a and 35b of the external exposure portion 31. In addition, the inner surface 47 of the exterior member 23 is also blocked by the outer surface of the internal insertion portion 32 and the third blocking portions 48.

<About Manufacturing to Path Routing of Wire Harness 9>

In the aforementioned configuration and structure, a wire harness 9 is manufactured in the following manner (e.g. see FIG. 2 and FIG. 3). That is, the wire harness 9 is manufactured by inserting two electrically conductive paths 22 from an opening at one end of an exterior member 23 toward an opening at the other end of the exterior member 23. The exterior member 23 is molded substantially linearly as a whole out of a resin. In addition, the wire harness 9 is manufactured by attaching clamps C, grommets, boots, etc. to predetermined positions of an outer surface of the exterior member 23. Further, the wire harness 9 is manufactured by providing shield connectors 14 on terminal portions of the electrically conductive paths 22.

Incidentally, it is a matter of course that the exterior end portion cap 25 can be attached to the exterior member 23 before the two electrically conductive paths 22 are inserted through the exterior member 23. Alternatively, after the two electrically conductive paths 22 are inserted through the exterior member 23, the exterior end portion cap 25 may be attached once in the vicinity of the end portion 24 and then slid to be attached to the end portion 24.

After the wire harness 9 is manufactured in the aforementioned manner, predetermined flexible pipe portions 29 are bent to be folded. Thus, packing of the wire harness 9 is completed. The wire harness 9 in the packed state is compact so that the wire harness 9 can be transported in such a compact state to a vehicle assembling site.

In the vehicle assembling site, the wire harness 9 is attached to an attachment subject 44 (structure body) of a vehicle, starting at a long portion corresponding to a vehicle underfloor 11. A longest straight pipe portion 30 of the exterior member 23 in the wire harness 9 is disposed on the long portion corresponding to the vehicle underfloor 11. Accordingly, the wire harness 9 is attached in a state in which flexure of the wire harness 9 is suppressed. On this occasion, the wire harness 9 is attached with excellent workability. After the long portion corresponding to the vehicle underfloor 11 is fixed by the clamps C etc., the remaining portion of the exterior member 23 is attached while the flexible pipe portions 29 are flexed (bent). When a series of works relevant to the attachment are completed, the wire harness 9 is routed in a desired path.

<About Advantageous Effects of Invention>

When each of the exterior end portion caps 25 is used as described above with reference to FIGS. 1A and 1B and FIGS. 2 to 10, sand etc. can be prevented from being easily intruding into the exterior member 23 in comparison with a case where, for example, only taping is applied to the end portion of the exterior member. Accordingly, according to the invention, an effect that damage on the electrically conductive path 22 inside the exterior member 23 can be prevented is obtained.

Incidentally, as to a modification of the invention, taping 50 may be applied, as shown in FIG. 11 (application of the taping 50 is optional). In addition, a clip portion 51 (fixation piece) may be provided integrally on the outer circumferential surface of the external exposure portion 31, as shown in FIG. 12. The clip portion 51 is formed as a portion for fixing the exterior member 23 to an attachment subject 49 (structure body) during path routing.

Moreover, although not shown particularly, the invention can be also applied to a case where the sectional shape of the exterior member is elliptical, and, for example, three (or four or two) electrically conductive paths are arranged side by side and laterally in a line.

Here, the above embodiments are summarized as follows.
(1) There is provided an exterior end portion cap to be attached to at least two electrically conductive paths and an exterior member having a tubular shape, and the at least two electrically conductive paths being led out from the exterior member, the exterior end portion cap including:

an external exposure portion having a first blocking portion and configured to be exposed to an outer side of the exterior member; and an internal insertion portion having a second block portion, being continuous to the external exposure portion, and configured to be inserted into the exterior member, wherein:

the internal insertion portion has an electrically conductive path exposing slit by which a part of outer surfaces of the at least two electrically conductive paths can be made to function as a third blocking portion when the internal insertion portion is attached to the at least two electrically conductive paths;

the first blocking portion is disposed on a side to which the internal insertion portion is continuous, and has a planar portion configured to abut against an end portion of the exterior member;

the second blocking portion has a convex portion that is disposed so as to face to the at least two electrically conductive paths arranged side by side and that is fitted to a gap between the at least two electrically conductive paths arranged side by side;

the exterior end portion cap is configured to be divided into two divided parts for holding the at least two electrically conductive paths each shaped like a circle in section therebetween; and the electrically conductive path exposing slit is disposed in a position corresponding to a position of a divided surface of the two divided parts and is formed so as to bring the part of the outer surfaces of the at least two electrically conductive paths into contact with an inner surface of the exterior member near the end portion of the exterior member in order to make the part of the outer surfaces of the at least two electrically conductive paths functions as the third blocking portion.

(2) For example, the exterior end portion cap further includes a hinge that connects the two divided parts, and concavely and convexly shaped engagement portions are formed on first end portions of divided surfaces of two divided parts, second end portions of the divided surfaces of two divided parts are opposed to the first end portions and are closer to the hinge than the first end portions.

(3) For example, a detachment preventing portion configured to be engaged with the inner surface of the exterior member is provided on an outer surface of the internal insertion portion.

(4) For example, a tapered surface configured to be guided by the end portion of the exterior member is formed at an insertion front end portion of the internal insertion portion configured to be inserted into the exterior member.

(5) For example, a fixation piece for fixing the exterior member to a structure body during path routing is provided integrally on an outer surface of the external exposure portion.

In addition, there is provided a wire harness including:

an exterior member having a tubular shape;

at least two electrically conductive paths that are arranged side by side and that are protected by the exterior member; and the exterior end portion cap according to any one of above first to fifth configurations that is attached to the at least two electrically conductive paths arranged side by side and the end portion of the exterior member.

According to the above item (1), the end portion of the exterior member can be blocked by the first blocking portion of the exterior end portion cap. In addition, the gap between the electrically conductive paths arranged side by side can be also blocked by the second blocking portion of the exterior end portion cap. Further, the inner surface (inner surface in line with the positions of the divided surfaces) of the exterior member can be also blocked by the portion (functioning as the third blocking portion) of the electrically conductive paths exposed from the pair of electrically conductive path exposing slits of the exterior end portion cap. By the first to third blocking portions, for example, sand etc. can be prevented from intruding into the exterior member from the outside even if the sand etc. tries to intrude. Accordingly, when the exterior end portion cap according to the invention is used, an effect that sand etc. can be prevented from easily intruding into the exterior member is obtained, in comparison with a case where, for example, only taping is applied. According to the invention as understood from the above description, since the sand etc. is absent from the inside of the exterior member, an effect that the electrically conductive paths can be prevented from being damaged easily is obtained even when the electrically conductive paths shake, for example, due to vibration during running. Moreover, according to the invention, since the exterior end portion cap having the two-part structure is used, an effect that the exterior end portion cap can be easily attached to the electrically conductive paths arranged side by side is also obtained. In addition, according to the invention, an effect that the electrically conductive paths can be retained in an immovable state or an effect that the electrically conductive paths can be disposed substantially at the center of the exterior member is also obtained.

According to the above item (2), the two divided parts of the exterior end portion cap are connected to each other through the hinge. With this configuration, an effect that the exterior end portion cap can be managed easily without increasing the number of components is obtained. In addition, according to the invention, the concavely and convexly shaped engagement portions are formed on the divided surfaces and engaged with each other, for example, in a press-fitted state. With this configuration, the exterior end portion cap can be prevented from returning to its divided state easily even when the hinge is broken. As a result, an effect that the state in which the sand etc. is prevented from intruding into the exterior member can be maintained is also obtained According to the above item (3), the detachment preventing portion is formed on the outer surface of the internal insertion portion. With this configuration, an effect that the detachment preventing portion can be hooked on the inner surface of the exterior member when the exterior end portion cap is inserted into the exterior member is obtained. Accordingly, according to the invention, an effect that the exterior end portion cap can be prevented from being detached is obtained. Moreover, according to the invention, since the detachment preventing portion is formed at one place, an effect that insertion work becomes easier to consequently contribute to reduction of an insertion load is also obtained in comparison with a case where a plurality of detachment preventing portions are provided.

According to the above item (4), the tapered surface is formed at the insertion front end portion of the internal insertion portion. With this configuration, the tapered surface is guided by the end portion of the exterior member when the internal insertion portion is inserted into the exterior member. As a result, an effect that the provision of the tapered surface can contribute to reduction of the insertion load is obtained.

According to the above item (5), the fixation piece is provided integrally on the outer surface of the external exposure portion. Accordingly, when the fixation piece is configured to, for example, function as a clamp or clip portion, an effect that the exterior member can be fixed to the structure body during the path routing without using any other fixation component which is required to be retrofitted is obtained.

According to the above item (6), there is provided the wire harness is configured to include the exterior end portion cap. With this configuration, for example, sand etc. can be prevented from intruding into the exterior member from the outside even if the sand etc. tries to intrude. As a result, an effect that damage on the electrically conductive paths inside the exterior member can be prevented is obtained.

It is a matter of course that the invention can be changed and carried out variously without departing from the gist of the invention.

What is claimed is:

1. An exterior end portion cap to be attached to at least two electrically conductive paths and an exterior member having a tubular shape, and the at least two electrically conductive paths being led out from the exterior member, the exterior end portion cap comprising:

an external exposure portion having a first blocking portion and configured to be exposed to an outer side of the exterior member; and an internal insertion portion having a second block portion, being continuous to the external exposure portion, and configured to be inserted into the exterior member, wherein:

the internal insertion portion has an electrically conductive path exposing slit by which a part of outer surfaces of the at least two electrically conductive paths can be made to function as a third blocking portion when the internal insertion portion is attached to the at least two electrically conductive paths;

the first blocking portion is disposed on a side to which the internal insertion portion is continuous, and has a planar portion configured to abut against an end portion of the exterior member;

the second blocking portion has a convex portion that is disposed so as to face to the at least two electrically conductive paths arranged side by side and that is fitted to a gap between the at least two electrically conductive paths arranged side by side;

the exterior end portion cap is configured to be divided into two divided parts for holding the at least two electrically conductive paths each shaped like a circle in section therebetween; and the electrically conductive path exposing slit is disposed in a position corresponding to a position of a divided surface of the two divided parts and is formed so as to bring the part of the outer surfaces of the at least two electrically conductive paths into contact with an inner surface of the exterior member near the end portion of the exterior member in order to make the part of the outer surfaces of the at least two electrically conductive paths functions as the third blocking portion.

2. The exterior end portion cap according to claim 1, further comprising:

a hinge that connects the two divided parts, wherein:

concavely and convexly shaped engagement portions are formed on first end portions of divided surfaces of two divided parts, second end portions of the divided surfaces of two divided parts are opposed to the first end portions and are closer to the hinge than the first end portions.

3. The exterior end portion cap according to claim 1, wherein:

a detachment preventing portion configured to be engaged with the inner surface of the exterior member is provided on an outer surface of the internal insertion portion.

4. An exterior end portion cap according to claim 1, wherein:

a tapered surface configured to be guided by the end portion of the exterior member is formed at an insertion front end portion of the internal insertion portion configured to be inserted into the exterior member.

5. The exterior end portion cap according to claim 1, wherein:
- a fixation piece for fixing the exterior member to a structure body during path routing is provided integrally on an outer surface of the external exposure portion.

6. A wire harness comprising:
- an exterior member having a tubular shape;
- at least two electrically conductive paths that are arranged side by side and that are protected by the exterior member; and
- the exterior end portion cap according to claim 1 that is attached to the at least two electrically conductive paths arranged side by side and the end portion of the exterior member.

* * * * *